United States Patent [19]

Morris et al.

[11] Patent Number: 5,060,276

[45] Date of Patent: Oct. 22, 1991

[54] TECHNIQUE FOR OBJECT ORIENTATION DETECTION USING A FEED-FORWARD NEURAL NETWORK

[75] Inventors: Robert J. T. Morris; Lawrence D. Rubin, both of Holmdel, N.J.

[73] Assignee: AT&T Bell Laboratories, Murray Hill, N.J.

[21] Appl. No.: 359,296

[22] Filed: May 31, 1989

[51] Int. Cl.$^5$ ............................................. G06K 9/00
[52] U.S. Cl. ......................................... 382/8; 382/46; 382/48
[58] Field of Search ........................... 382/61, 8, 46, 48

[56] References Cited

U.S. PATENT DOCUMENTS

| | | | |
|---|---|---|---|
| 3,801,775 | 4/1974 | Acker | 235/61.11 E |
| 3,847,346 | 11/1974 | Dolch | 235/61.11 E |
| 4,028,728 | 7/1977 | Sharp | 358/106 |
| 4,500,202 | 2/1985 | Smyth | 356/237 |
| 4,544,064 | 10/1985 | Felder | 209/583 |
| 4,578,810 | 3/1986 | MacFarlane et al. | 382/8 |
| 4,903,311 | 2/1990 | Nakamura | 382/9 |

OTHER PUBLICATIONS

Denker, 1984 *International Test Conf.*, Oct. 1984, Philadelphia, Pa., pp. 558-563.
Gogoussis et al., *Proc. SPIE Intl. Soc. Opt. Eng.*, Nov. 1984, Cambridge, Mass., pp. 121-127.
Svetkoff et al., *Hybrid Circuits (GB)* No. 13, May 1987, pp. 5-8.
Kohonen, *Self-Organization* & Memory, Second Ed., 1988, Springer-Verlag, pp. 199-209.
Specht, *IEEE Internatl. Conf. Neural Networks*, vol. 1, Jul. 1988, San Diego, Calif., pp. I-525 to I-532.
Wald, *Sequential Analysis*, Dover Publications Inc., 1947, pp. 34-43.

Primary Examiner—Leo H. Boudreau
Assistant Examiner—Andrew W. Johns

[57] ABSTRACT

The present invention relates to a technique in the form of an exemplary computer vision system for detecting the orientation of text or features on an object of manufacture. In the present system, an image of the features or text is used to extract lines using horizontal bitmap sums, and then individual symbols using vertical bitmap sums, using thresholds with each of the sums. The separated symbols are then appropriately trimmed and sealed to provide individual normalized symbols. A Decision Module comprising a Feed-Forward Neural network and a sequential decision arrangement determines the "up", "down" or "indeterminate" orientation of the text after a variable number of symbols have been processed. The system can then compare the determined orientation with a database to further determine if the object is in the "right-side up" "upside down" or "indeterminate" orientation.

10 Claims, 2 Drawing Sheets

TECHNIQUE FOR OBJECT ORIENTATION DETECTION USING A FEED-FORWARD NEURAL NETWORK

TECHNICAL FIELD

The present invention relates to a technique for detecting the orientation of features, such as printed text, on an object using a network including a decision arrangement in the form of a feed-forward neural network to determine the orientation of the object.

DESCRIPTION OF THE PRIOR ART

As assembly processes move towards "Just In Time" operation, automatic inspection becomes a more necessary technology. For example, a tight loop between an operation and its inspection can be created, thereby ensuring that when errors occur due to a manufacturing setup, no more than a minimum of defective items are produced. This contrasts with traditional batch manufacturing, where a lot or batch of a product may be made before an error is detected. Rapid detection offers other advantages as well. For example, in surface mounted assembly of circuit packs, components are first placed and held with an adhesive before being soldered. Therefore, an inspection system placed in-line after the placement operation can catch errors before the soldering process is performed, thereby also reducing the repair cost to a minimum.

Various arrangements have been devised for inspecting circuit boards for defects. For example, U.S. Pat. No. 4,028,827 issued to B. H. Sharp on June 7, 1977, discloses a video system for selectively ascertaining the presence and absence of, and discriminating between, at least two different types of light reflecting surface areas on articles. The system has use for inspecting circuit paths and solder connections. Another arrangement is disclosed in U.S. Pat. No. 4,578,810 issued to J. W. MacFarlane et al. on Mar. 25, 1986 wherein an automatic visual tester detects printed wiring board (PWB) defects. The detector comprises an array of optical sensors that forms a binary image pattern of the PWB for optically inspecting the printed wire circuit.

An article by S. P. Denker et al. in *Proceedings of International Test Conference*, Oct. 1984 in Philadelphia, Pa. at pages 558–563 discloses an automatic visual tester that detects printed circuit board (PCB) assembly errors using machine vision technology. In this tester, a camera is used to capture an image of the PCB, and transmits an electrical representation of this image to a computer which compares the features of the PCB image with an ideal image stored in memory to detect any assembly errors. An alternative arrangement was disclosed in the article by D. J. Svetkoff et al. in *Hybrid Circuits (GB)*, No. 13, May 1987 at pages 5–8 wherein a technique is disclosed for the automatic inspection of component boards using both a three-dimensional map of a circuit board under test and Gray-Scale vision data. The technique is described as usable for the detection of components such as solder paste volume, and measurements of orientation.

The prior art, although inspecting various locations of elements and whether connections and all components are properly placed on a circuit board, is limited to situations where the non-defective item always appears identical to a stored image. Absent from the prior art is a method to provide a low-cost, reliable and complete inspection system that will determine the orientation of the components themselves in various stages of manufacture, such as the loading of hoppers, component placement on a board before soldering, placement of a chip on a circuit board, etc. Furthermore, a problem with the prior art systems is that these inspection systems require the stored ideal images to match the inspected components, whereas the markings on components may vary considerably, for example, due to the use of date stamps or varying printing positions and styles.

SUMMARY OF THE INVENTION

The foregoing deficiency and problem in the prior art have been solved in accordance with the present invention which relates to a system for determining the orientation of features or markings, such as letters, numerals, trademark symbols, etc., on an object, e.g., an electrical component, to determine the feature orientation, and, in turn, the orientation of the object itself. In the present system, an image of all or part of the object is used to extract lines of symbols and individual symbols. The separated symbols are then each appropriately trimmed and scaled to provide normalized symbols before, for example, an Optimal Bayesian Decision method, in the form of a feed-forward neural network, determines the "right-side up", "upside-down" or "indeterminate" orientation of the text after a predetermined number of symbols are processed. Because the present invention can determine the orientation of features or markings without requiring a stored ideal image, it is insensitive to changes in content, e.g., date stamps and font style, while retaining the needed sensitivity to orientation.

Other and further aspects of the present invention will become apparent during the course of the following description and by reference to the accompanying drawings.

DETAILED DESCRIPTION

Figure 1:
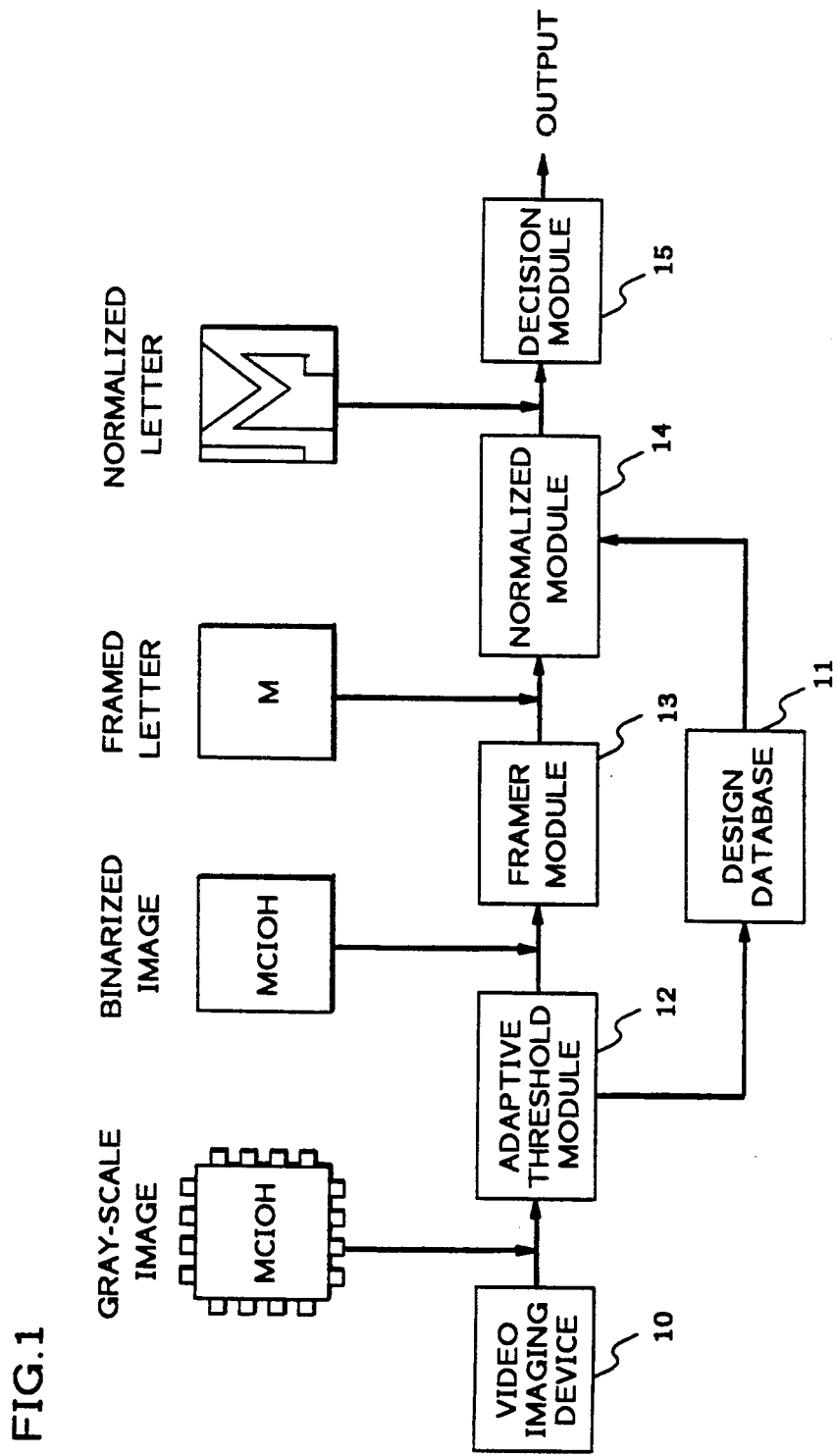
FIG. 1 is a block diagram of a preferred embodiment of an object orientation detection system in accordance with the present invention.

FIG. 1 is a block diagram of a preferred arrangement for an object orientation detection system in accordance with the present invention, which system is able to read information, such as printed text or markings, on a component e.g., an electrical device or chip, and determine the orientation of the information. Such system can be used, for example, in electronic assembly lines where sometimes hundreds of components are placed on a circuit pack. In such assembly lines, the components must be, for example, first loaded into their hoppers manually, and the symmetry of the component allows an orientation error to occur, either at setup or replenishment time. While many items have an orientation mark such as a notch, bevel or dot, there is at present no standardization of these marks and, where marks are used, they are often very hard to detect with a computer vision system. Some of the key requirements of a font orientation detection problem are (1) that there is no advance knowledge of the exact nature or content of the features, for example, font style or size; (2) the features are often poorly visible, for example, the printing is is often of poor quality; (3) detection must be carried out quickly while the probability of (a) detection of incorrect orientation should be as high as possible, and (b) a "false reject" be very low; and (4) there are many features, for example, characters that are invariant, or almost invariant, to a 180 degree rotation and would be read correctly in either orientation. Regarding this latter section, it should be noted that of the set of letters A-Z and digits 0-9, about 40% (namely BHIMOQSWXZ01689) are approximately either rotation invariant or rotation conjugate-invariant, i.e., symbols after rotation by 180 degrees appear like other symbols in the set, depending on the font used. For purposes of illustration, it is assumed hereinafter that the present system will be used to determine the orientation of a chip, but it should be understood that the present system could be adapted for use in determining the orientation of any object having single or multiple features thereon, such as, for example, boxes on a conveyor belt, labels on bottles, etc. Furthermore, the system is equally applicable for use in determining the orientation of features or markings other than text. The system relies only on having as an input a set of reference images which could be arbitrary.

In the orientation detection system of FIG. 1, a video imaging device 10 is provided including, for example, (1) a video camera, (2) a frame grabber to capture the picture signals associated with a frame of the video picture; and (3) analog-to-digital (A/D) hardware to provide, for example, 512-by-512 pixel frames with a real object scale of approximately 0.002 inches per pixel, and 256 gray levels per pixel. A reference design database 11 is used to store and provide an accurate footprint or position and size for each device being viewed, such as a chip relative to a board onto which it is assembled, and the feature orientation for a correctly placed or inserted device. The resultant images of the exemplary chips from the video image device 10 are provided as one input to an Adaptive Threshold Module (ATM) 12.

In ATM 12, the footprint of the chip from design database 11 is used to direct attention to the particular component or area of interest on the image of the chip from video imaging device 10, and such resultant component or area image may now only include, for example, 200-by-130 pixels instead of the 256-by-256 pixel image provided by video imaging device 10. ATM 12 transforms the resultant component or area image into a binary image where each pixel includes only a 0 or 1 level instead of one of the exemplary 256 gray levels. Although it is possible to omit this binarization step and process the image entirely with gray scale data, the ATM binarization step is present in the preferred embodiment, because it provides a much faster and lower cost implementation. In general, automatic evaluation of a suitable threshold between the original 256 gray levels and the two binary levels is a nontrivial problem, but in the present system a simple histogram method will work well because in most cases the text appears as one color on a contrasting background, and the gray level histogram has two fairly easily resolved peaks. These peaks are resolved adaptively using iteration of two parameters, namely the radial circumspection and mass threshold, until a satisfactory solution is obtained. The radial circumspection is the radius of a neighborhood in the histogram which is examined to verify that a value is a local maximum. To constitute a peak, a gray level must be both a local maximum and have a mass exceeding the mass threshold. This technique also allows correction so that the foreground is represented as a "1" and the background as a "0", regardless of whether the printing is light-on-dark or dark-on-light, etc.

The binary image produced by ATM 12 is provided as an input to a Framer Module 13 where the symbols (letters, numbers, etc.) of the image are captured. More particularly, such symbol capture can be performed by, for example, first taking horizontal sums of the bitmap matrix of 0's and 1's of the binary image to extract lines of symbols, and then taking vertical sums within lines to extract the individual symbols. For such purpose, preset quantile thresholds can be used. More particularly, for each scanline i of the binary image, the row sum r[i] is computed of the "1" bits. Thus r[i] contains peaks for rows of text, and valleys, or gaps, between rows of text. These peaks and gaps can be obscured by noise and variation of the text. Therefore, a threshold d can be used to separate the peaks from the gaps where, for example, $d = \delta r_{max}$, $\delta$ is a predetermined constant as, for example 0.07, and $r_{max}$ is the largest entry in the row sum vector r[]. The process essentially starts at the top scanline and proceeds through the subsequent scanlines looking for the beginning of a peak above a certain threshold and then continues over a peak area looking for a valley below a certain threshold, etc. to separate lines of symbols. Lines or gaps which appear too small are rejected as being attributed to noise. The process is then repeated using the column sums of the binary image to extract individual symbols. It should be noted that the technique of horizontal and vertical histograms can also disclose, and allow immediate correction for, a 90 degree rotation. To filter out isolated dots which may find their way through the process of ATM 12, the Framer Module 13 can be implemented to also ignore areas with a "connected dot mass" less than a predetermined constant. While such process may bring a risk of losing part of a broken valid symbol, no untoward effects on a recognizer procedure is found to occur. It is to be understood that the Framer Module 13 can also be omitted when the symbols are always in predetermined positions, but is included in the preferred embodiment because this module allows conventionally marked electronic components, on which the printing varies considerably in position, to be suitably inspected. The Framer Module 13, therefore, provides a displacement-invariance capability to the overall system.

A Normalization Module (NM) 14 accepts the output from Framer Module 13 and "trims and scales" each extracted symbol. Trimming is performed because the extracted symbols can have accompanying white, or almost white, spaces at the sides, top and/or bottom. Scaling is performed to scale up the symbol image to occupy a predetermined standard size of, for example, 24 rows by 16 columns. In certain cases this normalization process produces distortion to the original image as, for example, thin characters such as the letter "I" will be "fattened" to occupy the 16 columns. However, this is not undesirable as both the input data and the reference vectors described below are transformed in the same manner. The alternative of not fattening an exemplary "I" has the potential disadvantage of permitting a mismatch due to a vertical misalignment of a reference and sample image. It is to be understood that the Normalization module 14 can be omitted when symbols are always of a predetermined size, but is provided in the preferred embodiment, since NM 14 provides a scale-invariance capability to the system.

The signals representing the normalized symbols are then presented to a decision module 15 where a determination is made, using the design database 11 information, as to whether the symbols are disposed in the "up" or "down" orientation, or is "indeterminate" as to its orientation. As will be described hereinafter, a preferred arrangement for decision module 15 using a preferred Optimal Detection (OD) method, which, in its particular form, can also be termed a "Feedforward" (FF) neural network method, computes the likelihood of the symbol being oriented "up" or "down", or being "indeterminate", by computing a "similarity measure", as for example the Hamming distance, between bitmaps of the captured symbol and reference images, using a lookup table. A symbol, such as a letter, will be referred to in its normal orientation as "up" and in the inverted orientation as "down". An object, such as a chip, may have its text oriented correctly in either the "up" or "down" orientation. A correctly oriented chip will be referred to herein as "right-side up" and an incorrectly oriented chip as "upside down".

More particularly, observed images are bitmaps of length N, i.e., vectors in $\Omega = \{0,1\}^N$. It is assumed that there is a collection of reference images or symbols (i.e., letters, numerals, trademark logos, etc. in various fonts sizes, etc.) which appear in the "up" orientation as $u_1$, $u_2, \ldots, u_S$, and in the "down" orientation as $d_1, d_2, \ldots, d_S$. It is also assumed that there is a distortion process which represents both noise inherent in the images, noise due to the image capture process, and variation due to the use of font styles, sizes, etc., which are not in the reference set. This distortion process is represented hereinafter by $p(x|y)$, meaning that reference vector y is distorted into observed vector x with a probability $p(x|y)$. Also defined is that $p(x|u)$ or $p(x|d)$ is the probability that the vector x is observed, given that vector x is a distortion of a randomly chosen symbols from a reference set of $u_1, u_2, \ldots, u_S$ or $d_1, d_2, \ldots, d_S$, respectively. Then the probability $$p(x|u) = \sum_{i=1}^{S} p(x|u_i)p(u_i) \text{ and } p(x|d) = \sum_{i=1}^{S} p(x|d_i)p(d_i)$$

where $p(u_i)$ or $p(d_i)$ is the a priori probability that symbol $u_i$ or $d_i$, respectively, is used, given that the symbol has orientation "up" or "down". The symbols of the above reference set may, for example, comprise the letters A-Z, and numbers 0-9 in various sizes, font styles, and orientations. It should be noted that although a scaling operation is carried out in Normalization Module 14, the presence of multiple sizes in the reference set is desirable because fonts are not typically scale-invariant.

One formulation of the problem is then to find a partition of $\Omega$ into regions $\Omega_u$, $\Omega_d$, $\Omega_i$ representing decisions "up", "down" or "indeterminate". This problem is formulated as maximizing the probability of correct determination of orientation subject to a limit on the probability of a "false reject". This results in the following practical technique for optimal determination of the orientation of a single symbol.

The technique outputs:

d ("down") if $p(x|d)/p(x|u) \geq \lambda$, u ("up") if $p(x|d)/p(x|u) \leq \lambda^{-1}$, i ("indeterminate") otherwise.

The parameter $\lambda \geq 1$ is then adjusted from analysis or experiment to be as small as possible, but not so small that there are an excessive number of false rejects.

Determination of orientation occurs for a chip consisting of multiple symbols: $x(1), x(2), \ldots, x(L)$. Thus a conditional independence assumption:

$$P\{x(1), x(2), \ldots, x(L)|u\} = P\{x(1)|u\} \cdot P\{x(2)|u\} \ldots \cdot P\{x(L)|u\},$$

$$P\{x(1), x(2), \ldots, x(L)|d\} = P\{x(1)|d\} \ldots P\{x(2)|d\} \ldots P\{x(L)|d\}$$

is adopted.

Then the optimal test becomes to output:

$$d(\text{"down"}) \text{ if } \prod_{i=1}^{L} p(x(i)|d)/p(x(i)|u) \geq \lambda(L),$$

$$u(\text{"up"}) \text{ if } \prod_{i=1}^{L} p(x(i)|d)/p(x(i)|u) \leq \lambda(L)^{-1}$$

i ("indeterminate") otherwise.

If the time allocated to inspecting a board is sufficient, the best possible results are obtained by examining every symbol found on the object. However, it is often possible to obtain very high certainty about the orientation of the object before all of the symbols are read. This suggests the use of a Sequential Testing procedure as disclosed in the book "Sequential Analysis" by A. Wald, Dover Publications, 1947, at pages 34–43, wherein symbols are read until the cumulative product of likelihood ratios exceeds some upper bound $\lambda$ or falls below a lower bound $\lambda^{-1}$, at which time a determination of orientation is made. This may offer the potential of a significant speedup of the process, as measured by mean time per chip. Nevertheless, in cases where bias or poor knowledge of the prior distributions exists, it may still be desirable to use a slowly growing $\lambda$ function, or to limit the contribution to the product of any one observation.

Figure 2:
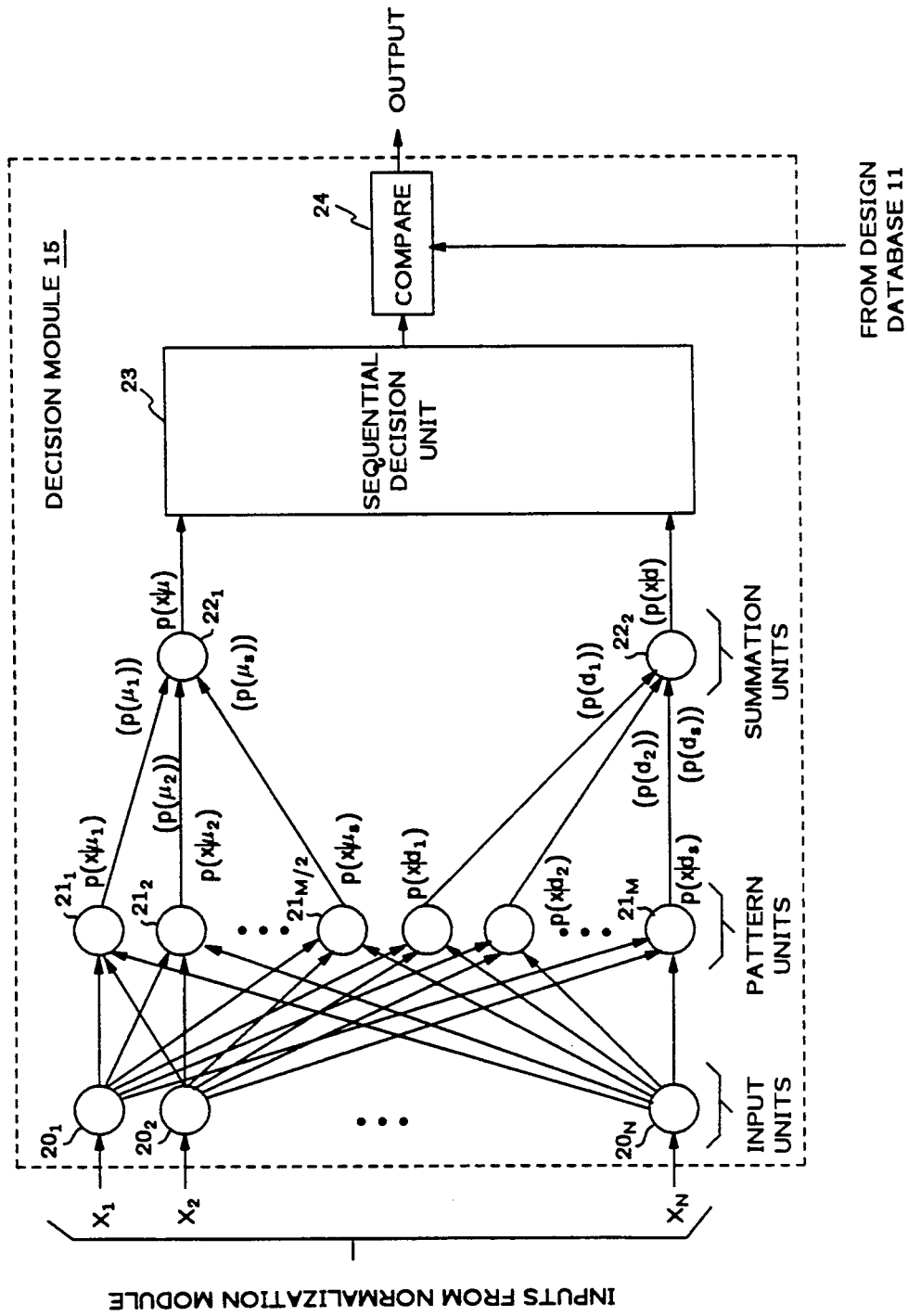
FIG. 2 is a block diagram of an exemplary arrangement for a decision module for use in the system of FIG. 1.

An exemplary arrangement for implementing the feed-forward neural network method in order for decision module 15 to carry out the above described process is shown in FIG. 2. In FIG. 2, the input from Normalization Module 14 comprises separate elements of the bitmap (matrix) for a normalized symbol and designated $x_1$ to $x_N$. Each of the bitmap elements $x_i$ are provided as an input to a separate Input Unit (IU) $20_1$ to $20_N$. More particularly, if each normalized symbol is arranged to be disposed within an exemplary bitmap matrix of 24-by-16 elements, then N would equal 384 elements and decision module 15 would include 384 Input Units 20. The output from each Input Unit $20_i$ is distributed to each of M Pattern Units $21_1$ to $21_M$, where, for example, a first half of the M pattern units 21 is used to determine the likelihoods $$p(x|u) = \sum_{i=1}^{S} p(x|u_i)p(u_i) \text{ and } p(x|d) =$$

-continued $$\sum_{i=1}^{S} p(x|d_i)p(d_i).$$ The values $p(u_i)$ and $p(d_i)$ are a priori probabilities which can be obtained, for example, from field studies, or by using uniform probabilities throughout, i.e., taking every symbol equally likely in either orientation. To obtain the values $p(X|u_i)$ and $p(X|d_i)$, some assumptions must be made about the distortion process. A simple exemplary model is adopted (1) that with probability $g(k)$, k bits of a bitmap are altered, and (2) that those bits are altered according to independent and identical distributed trials. Then $$p(x|u_i) = g(h(x,u_i))/\begin{bmatrix} N \\ h(x,u_i) \end{bmatrix}$$

where $h(x, u_i)$ is the Hamming distance between vectors x and $u_i$. A neural network view of this procedure is shown in FIG. 2. The first active layer, consisting of pattern units, 21, computes $p(X|u_i)$ and $p(X|d_i)$, in accordance with the above equation. The next layer, consisting of summation units $22_1$ and $22_2$, forms the likelihoods $p(x|u)$ and $p(x|d)$, and Sequential Decision Unit 23 gives the final decision for a chip. Parts of FIG. 2, and the terminology used, are similar to that used in the article by D. F. Specht in *The Proceedings of the IEEE International Conference On Neural Networks*, July, 1988, San Diego, Calif., Vol. 1, at pages I-525 to I-532; however, the internal structure of the pattern unit 21 is quite different. FIG. 2 immediately suggests a parallel implementation. It should be understood that the algebraic quantities shown on the interconnections in FIG. 2 are values being passed between the elements and that quantities enclosed in parenthesis are multiplicative weights.

The internal structure of the pattern units can be serial or parallel. The remainder of this paragraph describes a method for efficiently implementing the pattern units 21 when the "similarity measure" is a Hamming distance. In the absence of special purpose hardware for computing Hamming distances, there is a technique that can be employed to compute them very quickly. The Hamming distances between bitmaps can be computed a word at a time by taking the bitwise "exclusive or," and then using a precomputed table lookup which returns the number of one bits in the resulting word. This reduces the Hamming distance calculation to several machine instructions per word, and one can calculate distances in the order of a million words per second on a contemporary microprocessor.

After the operation of elements 20 through 22 of FIG. 2 are completed, an output probability value is obtained for each symbol. These are combined in the FF method using multiplication in the Sequential Decision Unit 23. The results can then be compared against an upper and lower threshold in Sequential Decision Unit 23 to generate an overall decision for the chip, or an indecision. This procedure can proceed according to a "stopping" rule whereby the processing of further symbols on the chip is discontinued when a prescribed degree of certainty has been obtained. Finally, the result for the chip is compared in Comparator 24 against the correct orientation for the chip, which orientation is stored in "the design database", and depending upon the setting, e.g., "stop on errors", or "stop on errors plus indecisions", an output signal is provided to, for example, operate an alarm or not.

It is to be understood that the above description of the Feed-Forward Neural Network method was for purposes of explanation, and not for purposes of limitation since any other suitable method could be used to provide the appropriate decision. For example, it is possible to apply the Learning Vector Quantization (LVQ) method similar to that described by T. Kohonen in the book "Self-Organization and Associative Memory", Second Edition, Springer-Verlag at pages 199-209. For the LVQ method, the result obtained in Decision Module 15 would merely be a "vote", i.e., the number of "up" scores divided by the total number of observations, and not an explicit probability value as found in the FF method.

We claim:

1. A method of determining the orientation of features or text on an object, the method comprising the steps of:
   (a) extracting a predetermined sized image of each of at least one of the features, or at least one symbol of the text, disposed on the object;
   (b) normalizing each of the at least one feature or symbol obtained in step (a) within a second predetermined sized image;
   (c) processing the predetermined sized image for each of the at least one feature or symbol obtained in step (a) or (b) for determining a similarity measure between the second sized image and a reference image and determining therefrom first and second conditional probabilities indicative of the at least one feature or symbol having an "up" or "down" orientation, respectively;
   (d) determining from the first and second conditional probabilities for each of the at least one feature or symbol obtained in step (c) whether the feature or text is in the "up" or "down" orientation or is in an "indeterminate" orientation; and
   (e) determining from the indication of the orientation of each one feature or symbol obtained in step (d) whether the object is in the "right-side up", "upside-down" or indeterminate orientation.

2. The method according to claim 1 wherein in performing step (a), performing the substeps of:
   (a1) summing the binary values for each of the rows of a bitmap of the features or text and applying a threshold value to the sums of the rows for determining the location of lines of features or text; and
   (a2) summing the binary values for each of the columns of a bitmap of the features or text and applying a second threshold value to the sums of the columns for determining, in conjunction with the result of step (a1), the location of the individual features or symbols of the text.

3. The method according to claim 1 or 2 wherein in performing step (c), performing the substeps of:
   (c1) determining, from a bitmap of each normalized extracted feature or symbol of the text obtained in step (a) or (b), the probability that an input vector is observed, by measuring the Hamming distance using bitwise "exclusive OR" and table lookup operations between the input vector and each of a set of reference features or symbols in a particular "up" or "down" orientation, where the input vector comprises a distortion of a similar feature or symbol from the reference set; and (c2) in response to step (c1), determining the conditional probabilities of obtaining the extracted symbol based on the extracted symbol having an up or down orientation.

4. The method according to claim 1 or 2 wherein in performing step (d):

multiplying the ratio of the first and second conditional probabilities determined for each symbol processed in step (c) with the product of the ratio obtained for each prior processed symbol until a certain threshold is attained indicating that the feature or text is in the "up", "down" or "indeterminate" orientation.

5. The method according to claim 1 or 2 wherein in performing step (d), performing the substeps of:

(d1) providing a determination of whether each symbol of the text is in the "up", "down" or "indeterminate" orientation; and (d2) from a consensus of the determinations made in step (d1), generating a determination of whether the text is in the "up", "down" or "indeterminate" orientation.

6. Apparatus for determining the orientation of a feature or text on an object comprising:

means for extracting a feature or symbol of the text from an image, and generating an output signal representative of a normalized sized bitmap for each extracted symbol; and a decision arrangement comprising first means responsive to the output signal from the extracting and generating means for determining a similarity measure between each such output signal for each extracted feature or symbol and each of a set of reference images, and generating an output signal for each extracted feature or symbol indicating the probability that each such extracted feature or symbol is in an "up", "down" or "indeterminate" orientation, and second means for generating an output signal indicating that the object is in the "up", "down" or "indeterminate" orientation in response to an accumulation of each output signal of the first means.

7. Apparatus according to claim 6 wherein the decision arrangement further comprises:

third means for determining the orientation of the object from the output signal of the second means.

8. Apparatus according to claims 6 or 7 wherein the extracting and generating means comprises:

means for generating a sum of the binary values for each of the rows of a bitmap of the image of each feature or text and applying a threshold value to the sums of the rows for generating an output signal indicating the location of lines within the feature or text;

means for generating a sum of each of the columns of a bitmap of the image of the feature or text and applying a second threshold value to the sums of the columns for determining, from both the output signal from the first means and the sums of the columns, the location of each feature or each symbol within the text.

9. Apparatus according to claim 6 or 7 wherein the second means of the decision apparatus comprises:

means responsive to each said output signal from the first means of the decision apparatus for multiplying a ratio of the probabilities determined for each said output signal with a product formed from the ratio of probabilities of each prior processed feature or symbol of the text until a certain threshold is attained indicating that each feature or text is in the "up", "down" or "indeterminate" orientation and generating an output signal representative of such orientation determination.

10. Apparatus according to claim 6 or 7 wherein the second means of the decision apparatus comprises:

means for generating an output signal indicating whether each feature or symbol of the text is in the "up", "down" or "indeterminate" orientation, and means for forming a consensus from the output signals from the generating means of the second means for determining whether the features or text are in the "right-side up", "upside-down" or "indeterminate" orientation.

* * * * *